US008253627B1

(12) United States Patent
Burgess

(10) Patent No.: US 8,253,627 B1
(45) Date of Patent: *Aug. 28, 2012

(54) POSITION DETERMINATION WITH NRSC-5 DIGITAL RADIO SIGNALS

(76) Inventor: David Burgess, Fairfield, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/705,699

(22) Filed: Feb. 15, 2010

Related U.S. Application Data

(60) Provisional application No. 61/152,292, filed on Feb. 13, 2009.

(51) Int. Cl.
G01S 3/02 (2006.01)
(52) U.S. Cl. .......................... 342/463; 342/465
(58) Field of Classification Search .................. 342/453, 342/458, 463–465; 455/456.5, 456.6, 457
See application file for complete search history.

(56) References Cited

U.S. PATENT DOCUMENTS

| 4,555,707 | A | 11/1985 | Connelly |
| 4,652,884 | A | 3/1987 | Starker |
| 4,700,306 | A | 10/1987 | Wallmander |
| 4,894,662 | A | 1/1990 | Counselman |
| 5,045,861 | A | 9/1991 | Duffett-Smith |
| 5,157,686 | A | 10/1992 | Omura et al. |
| 5,166,952 | A | 11/1992 | Omura et al. |
| 5,271,034 | A | 12/1993 | Abaunza |
| 5,323,322 | A | 6/1994 | Mueller et al. |
| 5,398,034 | A | 3/1995 | Spilker, Jr. |
| 5,481,316 | A | 1/1996 | Patel |
| 5,504,492 | A | 4/1996 | Class et al. |
| 5,510,801 | A | 4/1996 | Engelbrecht et al. |
| 5,604,765 | A | 2/1997 | Bruno et al. |
| 5,630,206 | A | 5/1997 | Urban et al. |
| 5,648,982 | A | 7/1997 | Durrant et al. |
| 5,774,829 | A | 6/1998 | Cisneros et al. |
| 5,784,339 | A | 7/1998 | Woodsum et al. |
| 5,835,060 | A | 11/1998 | Czarnecki et al. |
| 5,920,284 | A | 7/1999 | Victor |
| 5,952,958 | A | 9/1999 | Speasl et al. |
| 5,953,311 | A | 9/1999 | Davies et al. |
| 6,006,097 | A | 12/1999 | Hornfeldt et al. |
| 6,016,119 | A | 1/2000 | Krasner |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,144,413 | A | 11/2000 | Zatsman |

(Continued)

FOREIGN PATENT DOCUMENTS

DE 3242997 A1 5/1984

(Continued)

OTHER PUBLICATIONS

U.S. Appl. No. 10/008,613, Pierce, et al.

(Continued)

Primary Examiner — Dao Phan
(74) Attorney, Agent, or Firm — Woodcock Washburn LLP

(57) ABSTRACT

Apparatus to determine the position of a user terminal, the apparatus having corresponding methods and computer-readable media, comprises: a receiver to receive, at the user terminal, a wireless NRSC-5 digital radio signal; and a pseudorange module to determine a pseudorange between the receiver and a transmitter of the NRSC-5 digital radio signal based on the NRSC-5 digital radio signal; wherein the position module determines the position of the user terminal based on the pseudorange and a location of the transmitter.

13 Claims, 3 Drawing Sheets

U.S. PATENT DOCUMENTS

| | | | |
|---|---|---|---|
| 6,147,642 A | 11/2000 | Perry et al. |
| 6,181,921 B1 | 1/2001 | Konisi et al. |
| 6,184,921 B1 | 2/2001 | Limberg |
| 6,201,497 B1 | 3/2001 | Snyder et al. |
| 6,215,778 B1 | 4/2001 | Lomp et al. |
| 6,289,280 B1 | 9/2001 | Fernandez-Corbaton et al. |
| 6,317,452 B1 | 11/2001 | Durrant et al. |
| 6,317,500 B1 | 11/2001 | Murphy |
| 6,373,432 B1 | 4/2002 | Rabinowitz et al. |
| 6,374,177 B1 | 4/2002 | Lee et al. |
| 6,400,753 B1 | 6/2002 | Kohli et al. |
| 6,433,740 B1 | 8/2002 | Gilhousen |
| 6,437,832 B1 | 8/2002 | Grabb et al. |
| 6,484,034 B1 | 11/2002 | Tsunehara et al. |
| 6,522,297 B1 | 2/2003 | Rabinowitz et al. |
| 6,559,800 B2 | 5/2003 | Rabinowitz et al. |
| 6,559,894 B2 | 5/2003 | Omura et al. |
| 6,590,529 B2 | 7/2003 | Schwoegler |
| 6,646,603 B2 | 11/2003 | Dooley et al. |
| 6,717,547 B2 | 4/2004 | Spilker, Jr. et al. |
| 6,727,847 B2 | 4/2004 | Rabinowitz et al. |
| 6,753,812 B2 | 6/2004 | Rabinowitz et al. |
| 6,806,830 B2 | 10/2004 | Panasik et al. |
| 6,839,024 B2 | 1/2005 | Spilker, Jr. et al. |
| 6,859,173 B2 | 2/2005 | Spilker, Jr. et al. |
| 6,861,984 B2 | 3/2005 | Rabinowitz et al. |
| 6,879,286 B2 | 4/2005 | Rabinowitz et al. |
| 6,914,560 B2 | 7/2005 | Spilker, Jr. et al. |
| 6,917,328 B2 | 7/2005 | Rabinowitz et al. |
| 6,937,866 B2 | 8/2005 | Duffett-Smith et al. |
| 6,952,182 B2 | 10/2005 | Spilker, Jr. et al. |
| 6,961,020 B2 | 11/2005 | Robinowitz et al. |
| 6,963,306 B2 | 11/2005 | Spilker, Jr. et al. |
| 6,970,132 B2 | 11/2005 | Spilker, Jr. et al. |
| 7,042,396 B2 | 5/2006 | Omura et al. |
| 7,042,949 B1 | 5/2006 | Omura et al. |
| 7,126,536 B2 | 10/2006 | Rabinowitz et al. |
| 7,260,378 B2 | 8/2007 | Holland et al. |
| 7,269,424 B2 | 9/2007 | Camp, Jr. |
| 7,372,405 B2 | 5/2008 | Rabinowitz et al. |
| 7,463,195 B2 | 12/2008 | Rabinowitz et al. |
| 7,466,266 B2 | 12/2008 | Opshaug |
| 7,471,244 B2 | 12/2008 | Omura et al. |
| 2002/0122003 A1 | 9/2002 | Patwari et al. |
| 2002/0168988 A1 | 11/2002 | Younis |
| 2002/0184653 A1 | 12/2002 | Pierce et al. |
| 2003/0162547 A1 | 8/2003 | McNair |
| 2004/0073914 A1 | 4/2004 | Spilker et al. |
| 2004/0201779 A1 | 10/2004 | Spilker et al. |
| 2005/0066373 A1 | 3/2005 | Rabinowitz |
| 2005/0251844 A1 | 11/2005 | Martone et al. |
| 2007/0050824 A1 | 3/2007 | Lee et al. |
| 2007/0121555 A1 | 5/2007 | Burgess et al. |
| 2007/0131079 A1 | 6/2007 | Opshaug et al. |
| 2009/0070847 A1 | 3/2009 | Furman et al. |
| 2009/0175379 A1 | 7/2009 | Rubin et al. |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/209,971, Do, et al.
U.S. Appl. No. 12/263,731, Rabinowitz, et al.
U.S. Appl. No. 12/351,841, Lee, et al.
U.S. Appl. No. 12/476,992, Do, et al.
U.S. Appl. No. 12/578,456, Opshaug, et al.
U.S. Appl. No. 12/582,051, Opshaug, et al.
U.S. Appl. No. 12/705,699, Burgess.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," 11$^{th}$ IEEE International Symposium on Personal Indoor and Mobile Radio Communications, PIMRC 2000, Proceedings (Cat. No. 00TH8525), Proceedings of 11$^{th}$ International Symposium on Personal Indoor and Mobile Radio Communication, London, UK, Sep. 18-21, pp. 1449-1453, vol. 2, XP010520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.
U.S. Appl. No. 12/117,676, filed May 8, 2008, Rabinowitz.

POSITION DETERMINATION WITH NRSC-5 DIGITAL RADIO SIGNALS

CROSS-REFERENCE TO RELATED APPLICATIONS

This application claims benefit of U.S. Provisional Patent Application Ser. No. 61/152,292 filed Feb. 13, 2009, the disclosure thereof incorporated by reference herein in its entirety.

FIELD

The present invention relates generally to position determination, and particularly to position determination with NRSC-5 digital radio signals.

BACKGROUND

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of –160 dBw as received by an omni-directional antenna). Thus the signal is marginally useful or not useful at all in the presence of blockage or inside a building.

SUMMARY

In general, in one aspect, an embodiment features an apparatus to determine the position of a user terminal, comprising: a receiver to receive, at the user terminal, a wireless NRSC-5 digital radio signal; and a pseudorange module to determine a pseudorange between the receiver and a transmitter of the NRSC-5 digital radio signal based on the NRSC-5 digital radio signal; wherein the position module determines the position of the user terminal based on the pseudorange and a location of the transmitter.

Embodiments of the apparatus can include one or more of the following features. Some embodiments comprise a correlator to correlate the NRSC-5 digital radio signal with a reference waveform; wherein the pseudorange module determines the pseudorange based on an output of the correlator. Some embodiments comprise a signal generator to generate the reference waveform. In some embodiments, the receiver receives control data; and the signal generator generates the reference waveform based on the control data. Some embodiments comprise a position module to determine the position of the user terminal based on the pseudorange and the location of the transmitter. In some embodiments, to determine the position of the user terminal, the position module determines an offset between a local time reference in the user terminal and a master time reference, and determines the position of the user terminal based on the pseudorange, the location of the transmitter, and the offset. Some embodiments comprise the user terminal comprising the apparatus.

In general, in one aspect, an embodiment features a method for determining the position of a user terminal, comprising: receiving, at the user terminal, a wireless NRSC-5 digital radio signal; and determining a pseudorange between the receiver and a transmitter of the NRSC-5 digital radio signal based on the NRSC-5 digital radio signal; wherein the position of the user terminal is determined based on the pseudorange and a location of the transmitter.

Embodiments of the method can include one or more of the following features. Some embodiments comprise correlating the NRSC-5 digital radio signal with a reference waveform; wherein the pseudorange is determined based on an output of the correlating. Some embodiments comprise generating the reference waveform. Some embodiments comprise receiving control data; and generating the reference waveform based on the control data. Some embodiments comprise determining the position of the user terminal based on the pseudorange and the location of the transmitter. In some embodiments, determining the position of the user terminal comprises: determining an offset between a local time reference in the user terminal and a master time reference; and determining the position of the user terminal based on the pseudorange, the location of the transmitter, and the offset.

In general, in one aspect, an embodiment features computer-readable media embodying instructions executable by a computer to perform a method comprising: determining a pseudorange between a receiver of a wireless NRSC-5 digital radio signal and a transmitter of the NRSC-5 digital radio signal based on the NRSC-5 digital radio signal; wherein the position of the user terminal is determined based on the pseudorange and a location of the transmitter.

Embodiments of the computer-readable media can include one or more of the following features. In some embodiments, the method further comprises: correlating the NRSC-5 digital radio signal with a reference waveform; wherein the pseudorange is determined based on an output of the correlating. In some embodiments, the method further comprises: generating the reference waveform. In some embodiments, the method further comprises: receiving control data; and generating the reference waveform based on the control data. In some embodiments, wherein the method further comprises: determining the position of the user terminal based on the pseudorange and the location of the transmitter. In some embodiments, determining the position of the user terminal comprises: determining an offset between a local time reference in the user terminal and a master time reference; and determining the position of the user terminal based on the pseudorange, the location of the transmitter, and the offset.

The details of one or more implementations are set forth in the accompanying drawings and the description below. Other features will be apparent from the description and drawings, and from the claims.

Figure 1:
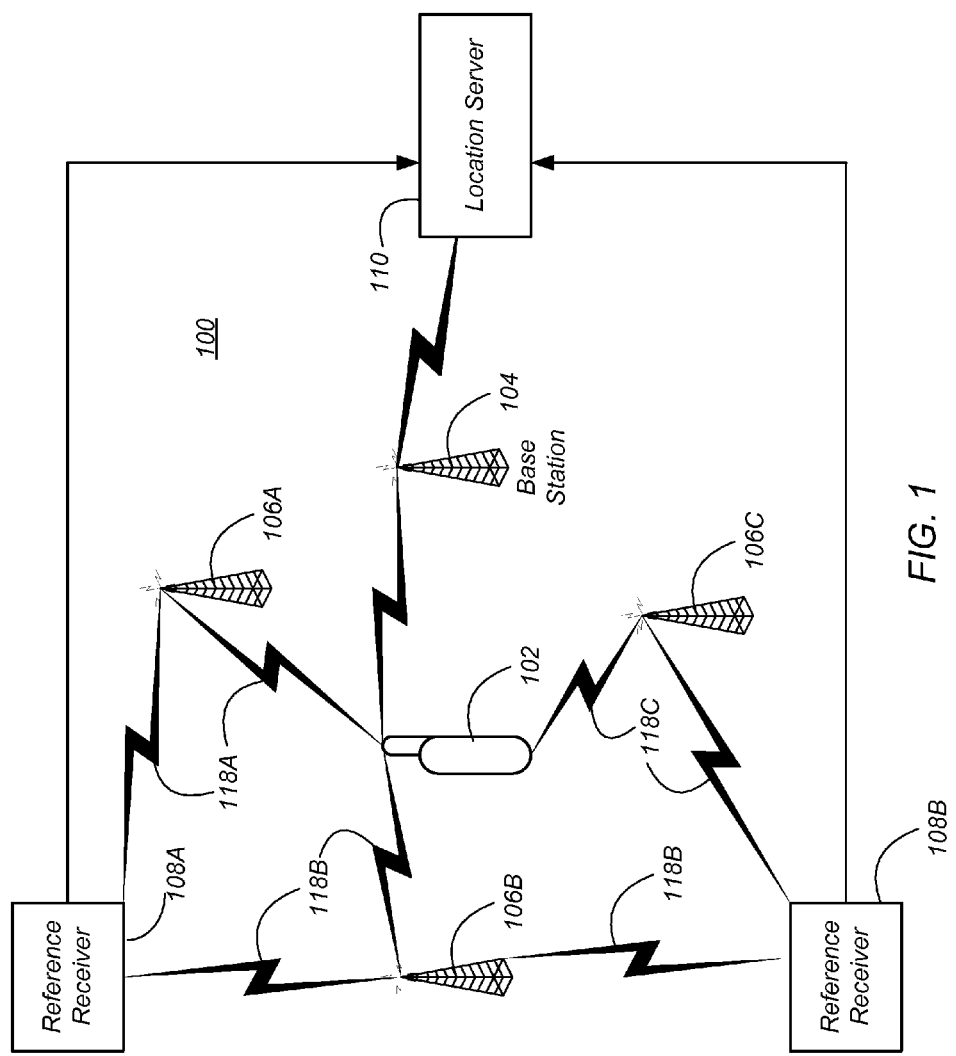
FIG. 1 shows an example implementation for a user terminal according to some embodiments.

The leading digit(s) of each reference numeral used in this specification indicates the number of the drawing in which the reference numeral first appears.

DETAILED DESCRIPTION

As used herein, the terms "client" and "server" generally refer to an electronic device or mechanism. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Embodiments of the present disclosure provide position determination using NRSC-5 digital radio signals. In the described embodiments, the position of a user terminal is determined with one or more wireless NRSC-5 digital radio signals. The NRSC-5 digital radio signal is described in "NRSC-5-B In-band/on-channel Digital Radio Broadcasting Standard," April 2008, by the National Radio Systems Committee, also referred to herein as "the NRSC-5 standard." The NRSC-5 digital radio signal is further described in "HD Radio Air Interface Design Description—Layer 1 FM" (NRSC-5-B reference document 1011s), also referred to herein as "the Layer 1 standard." Unless otherwise noted, the present disclosure describes the NRSC-5 digital radio signal with reference to the Layer 1 standard.

FIG. 1 shows an example implementation 100 for a user terminal 102 according to some embodiments. Referring to FIG. 1, implementation 100 also includes a wireless base station 104, transmitters 106A-C, reference receivers 108A-B, and a location server 110. Although in the described embodiments, the elements of user terminal 102 are presented in one arrangement, other embodiments may feature other arrangements, as will be apparent to one skilled in the relevant arts based on the disclosure and teachings provided herein. For example, the elements of user terminal 102 can be implemented in hardware, software, or combinations thereof.

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

User terminal 102 receives wireless NRSC-5 digital radio signals 118A-C from respective transmitters 106A-C. When receiving NRSC-5 digital radio signals 118 from three or more transmitters 106, user terminal 102 can determine its location without the use of other signals. When receiving fewer than three NRSC-5 digital radio signals 118, user terminal 102 can use additional signals, such as GPS signals, broadcast television signals, and the like, to supplement the NRSC-5 digital radio signals 118 for position determination.

In some embodiments, user terminal 102 determines its location autonomously. In some embodiments, user terminal 102 determines its location independently, that is, using only the received signals and information stored on user terminal 102. In other embodiments, user terminal 102 also employs information received from location server 110 to determine its position, as described below.

In other embodiments, user terminal 102 provides measurements of the received signals 118 to location server 110, and location server 110 determines the position of user terminal 102. Communication with location server 110 can be provided by base station 104. For example, in some implementations, user terminal 102 is a wireless telephone and base station 104 is a wireless telephone base station. In some implementations, base station 104 is part of a mobile MAN (metropolitan area network) or WAN (wide area network). In some embodiments, reference receivers 108 at known locations receive the same wireless NRSC-5 digital radio signals as user terminal 102, and send measurements of the signals to location server 110.

The NRSC-5 digital radio signals contain a-priori known features that can be used for time-of-arrival (TOA) estimation. When TOA estimates are made for signals from a plurality of transmitters, and knowledge of the transmitter locations and timing is available, the location of user terminal 102 can be determined.

The NRSC-5 digital radio signal is an OFDM-type signal, composed of a large number of adjacent narrowband subcarriers, also referred to herein simply as "subcarriers." Some of these subcarriers are reserved as reference subcarriers, described for example in Sections 11.2.3 and 12.2.2 in the Layer 1 standard. Each transmitter uses these reference subcarriers to transmit identity and configuration information associated with the transmitter. Each reference subcarrier is modulated with a data sequence that is synchronous with the OFDM symbol rate and repeats with a period of 0.092864 seconds. The reference subcarriers are depicted, for example, in FIGS. 5-5 and 5-6 of the Layer 1 standard.

Because the data modulated onto the reference subcarriers are periodic, synchronous with the OFDM symbols and can be known a priori, the specific combined waveform of the reference subcarriers can be computed a priori. Once computed, this reference waveform can be used as a matched filter to estimate the TOA of the start of the reference data period of the NRSC-5 digital radio signal. TOA estimates from a plurality of transmitters can be used to calculate the position of user terminal 102. The specific technique used for this calculation is selected based upon the manner in which the NRSC-5 transmitter network is operated, that is, upon whether the network is synchronized.

In a synchronized network, the transmitters are synchronized to a common clock, and start transmission of their reference subcarriers simultaneously. In this synchronized network, the TOA estimates and the known transmitter positions can be used to calculate both the position of user terminal 102 and the time-of-reception using a standard time-difference-of-arrival-plus-bias geolocation algorithm. Because the transmitter positions and reference carrier data change infrequently, this information can be stored in user terminal 102, allowing autonomous operation that requires no other supporting elements.

In an unsynchronized network, the transmitters are operated independently. In this case, one or more reference receivers 108 are used to estimate the time-of-transmission (TOT) of the reference subcarrier sequence for each transmitter, and to express those TOT estimates in terms of a common clock, such as UTC or GPS. The TOA estimates of user terminal 102, the TOT estimates of reference receiver(s) 108, and positions of transmitters 106 can be used to calculate the position of user terminal 102 and TOR using a standard TOA-plus-bias or TOA geolocation algorithm. In this positioning technique, user terminal 102 is given frequent updates of the data obtained by reference receiver(s) 108. This data can be passed to user terminal 102, for example, by base station 104, by the NRSC-5 digital radio signals 118, or the like.

Figure 2:
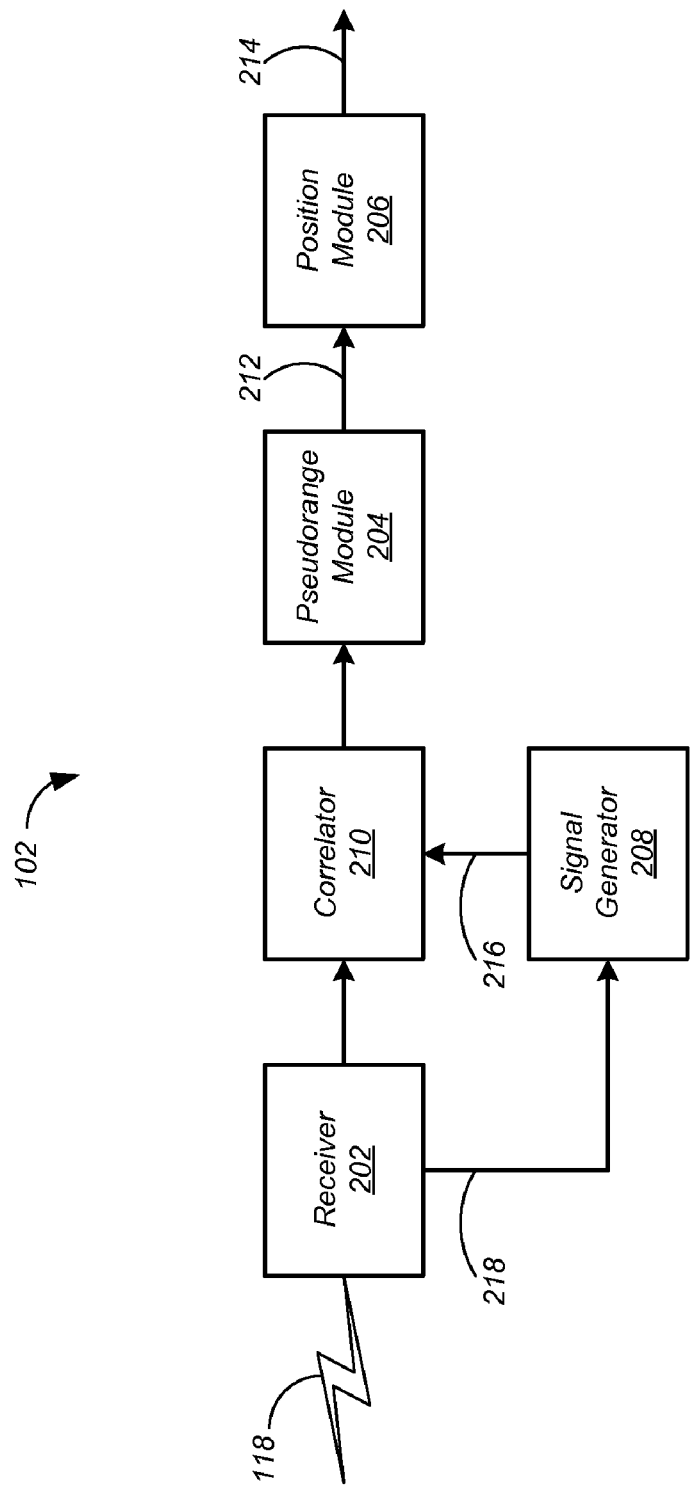
FIG. 2 shows a block diagram of the user terminal of FIG. 1 according to some embodiments.

FIG. 2 shows a block diagram of user terminal 102 of FIG. 1 according to some embodiments. Referring to FIG. 2, user terminal 102 includes a receiver 202 to receive wireless NRSC-5 digital radio signals 118, a pseudorange module 204 to determine pseudoranges 212 based on the received NRSC-5 digital radio signals 118, and a position module 206 to determine the position 214 of user terminal 102 based on the pseudoranges 212 and locations of the transmitters 106 of the signals 118. User terminal 102 includes also a signal generator 208 to generate a reference waveform 216 and a correlator 210 to correlate the received NRSC-5 digital radio signals 118 with the reference waveform 216. In some embodiments, the reference waveform 216 is provisioned with user terminal 102. In other embodiments, signal generator 208 generates reference waveform 216 based on control data 218 received by user terminal 102. For example, control data 218 can be generated by location server 110 based on measurements of signals 118 made by reference receivers 108.

Figure 3:
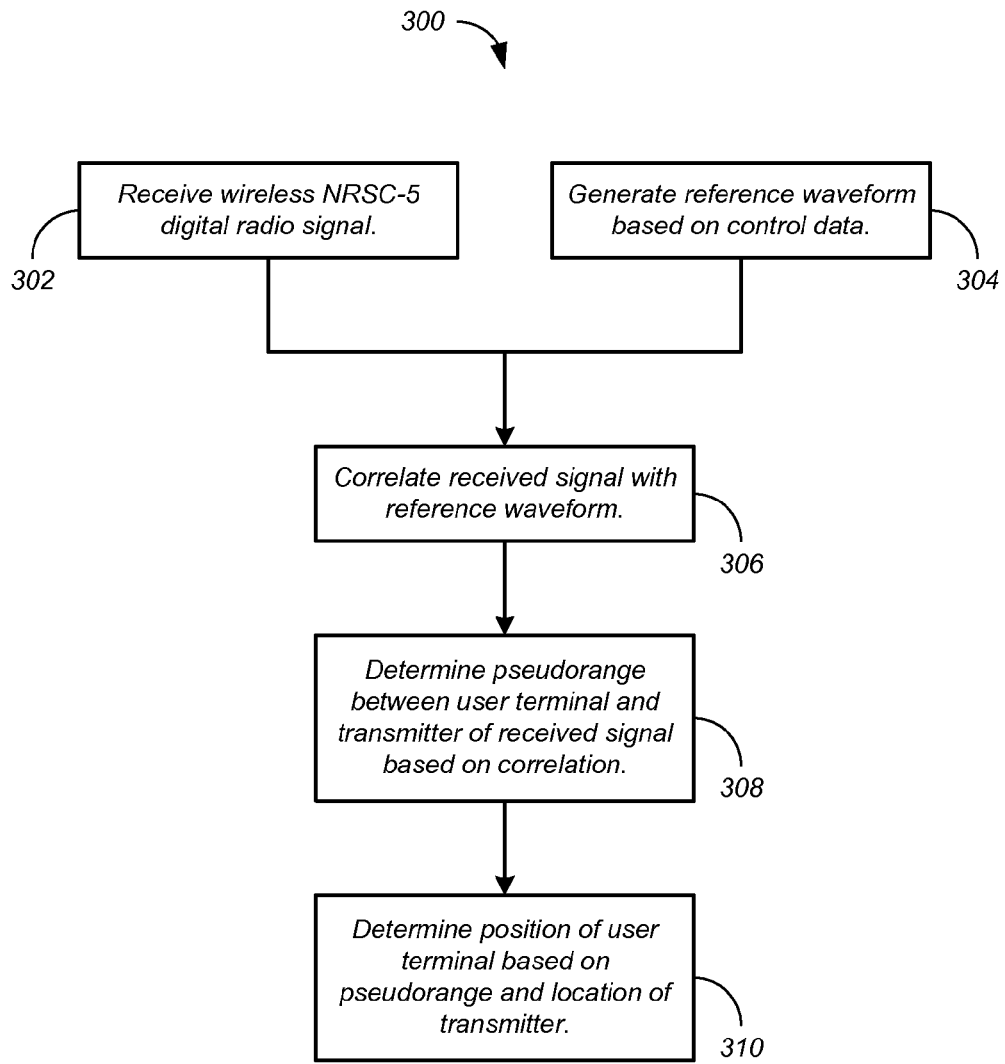
FIG. 3 shows a flowchart of a positioning process for the user terminal of FIG. 2 according to some embodiments of the present disclosure.

FIG. 3 shows a flowchart of a positioning process 300 for user terminal 102 of FIG. 2 according to some embodiments of the present disclosure. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Referring to FIG. 3, at 302, receiver 202 of user terminal 102 receives a wireless NRSC-5 digital radio signal 118. At 304, signal generator 208 generates reference waveform 216 based on control data 218. Control data 218 can be provisioned in user terminal 102, passed to user terminal 10 by location server 110, or the like. Signal 118 has multiple service modes, which can employ different numbers of reference subcarriers. Signal generator 208 can employ all available subcarriers in generating reference waveform 216.

Control data 218, also referred to as system control channel (SCCH) data, is sent on the reference carriers of the wireless NRSC-5 digital radio signal 118, as defined in Section 6 and Table 6-1 of the Layer 1 standard. Section 11.2 defines the process by which the control data parameters are formatted into a 32-bit word called the "reference subcarrier control data sequence." There are two formats for this control data sequence. The primary format is shown in FIG. 11-2 of the L1 standard, while the secondary format is shown in FIG. 11-3. Each NRSC-5 digital radio signal is transmitted in one of a plurality of service modes. The primary format is present in all service modes. The secondary format is present only in service modes that are not used in conjunction with conventional analog radio service.

Reference subcarriers 0-14 and 45-60 carry the primary reference subcarrier system control data sequence, which is the same on every one of those subcarriers with the exception of a 2-bit field that is a function of the reference subcarrier number defined by Table 11-3 of the L1 standard. Reference subcarriers 15-44 carry the secondary reference subcarrier system control data sequence, which is the same on every one of those subcarriers with the exception of a 2-bit field that is a function of reference subcarrier number defined by Table 11-3 of the L1 standard. In current systems, the secondary subcarriers do not appear because that spectrum is used for conventional analog radio service.

These control data sequences are differentially encoded and modulated onto their respective reference subcarriers. Every OFDM symbol of the total signal carries one bit of the primary control data sequence and (if present) one bit of the secondary control data sequence. Each bit (if present) appears in multiple copies on multiple reference subcarriers. The entire 32-bit control data sequence is transmitted over a period of 32 OFDM symbols. This period of 32 OFDM symbols is an "L1 Block Duration," as defined in Section 3.5 of the L1 standard, and has a duration of 0.09288 seconds, meaning that the reference carrier waveform repeats with a frequency of 10.7666 Hz.

Referring again to FIGS. 2 and 3, at 306, correlator 210 correlates the received signal 118 with reference waveform 216. For example, reference waveform 216 can be used as a matched filter to process received NRSC-5 digital radio signal 118.

In any of the service modes, the reference subcarriers account for about 5.5% of the total energy in signal 118, meaning that it has a natural SINR (Signal to Interference-plus-Noise Ratio) of −12.6 dB. Each subcarrier has a bandwidth of 363.4 Hz, and in the most commonly expected service modes, there will be 20-30 reference subcarriers giving a total bandwidth of 7.2-10.9 kHz and a time-bandwidth product of 28-30 dB over every L1 block and 38-40 dB over one second.

The data modulated upon the reference subcarriers includes a 4-bit block counter that increments in every L1 block (every 0.09288 seconds). This block counter repeats in a 16-block 1.4861-second cycle. Therefore user terminal 102 can assume any valid value of the block counter, and try the resulting matched filter in 16 different positions. Once user terminal 102 is synchronized to the block counter, signal generator 208 can generate matching reference waveforms 216 in a predictable manner by generating a local copy of the block counter.

The reference carrier data waveform has a period of 32 OFDM symbols, or 0.092864 seconds. There are 20-30 reference subcarriers in NRSC-5 digital radio signal 118, depending on the service mode. Each subcarrier has a bandwidth of 363.4 Hz, given a total reference waveform bandwidth of 7,268-10,902 Hz. The period and total bandwidth together give a time-bandwidth product of 675-1012, corresponding to 28-30 dB of processing gain for a full-period matched filter.

Referring again to FIGS. 2 and 3, at 308, pseudorange module 204 determines a pseudorange 212 between user terminal 102 and the transmitter 106 of the received signal 118 based on signal 118. That is, pseudorange module 204 determines pseudorange 212 based on an output of correlator 210. For example, pseudorange module 204 can include a peak detector to detect a time offset corresponding to a maximum correlation result.

Then at 310, position module 206 determines the position 214 of user terminal 102 based on pseudorange 212 and the location of the respective transmitter 106. The identity of the transmitter 106 is included in the data modulated upon the reference subcarriers, and so can be obtained from signal 118. In most cases the local time reference of user terminal 102 has some offset from the master time reference used. In such cases, position module 206 determines the position 214 of user terminal 102 based on that offset. The reference data period of 0.092864 corresponds to an ambiguity distance of roughly 16,000 miles. Because this distance is much greater than the expected reception range for signal 118, no special provisions are required for resolving these ambiguities.

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described. Nevertheless, it will be understood that various modifications may be made without departing from the spirit and scope of the disclosure. Accordingly, other implementations are within the scope of the following claims.

What is claimed is:

1. An apparatus to determine the position of a user terminal, comprising:
   a receiver configured to receive, at the user terminal, a wireless digital radio signal;
   a pseudorange module configured to determine a pseudorange between the receiver and a transmitter of the digital radio signal based on the digital radio signal; and
   a position module configured to determine the position of the user terminal based on the pseudorange and a location of the transmitter;
   wherein the digital radio signal comprises a NRSC-5 signal, wherein said NRSC-5 signal is modulated using orthogonal frequency division multiplexing (OFDM) and is composed of a plurality of adjacent narrowband subcarriers, and further comprising:
   a correlator configured to correlate the digital radio signal with a reference waveform;
   wherein the pseudorange module is configured to determine the pseudorange based on an output of the correlator.

2. The apparatus of claim 1, further comprising:
   a signal generator configured to generate the reference waveform.

3. The apparatus of claim 2:
   wherein the receiver is configured to receive control data; and
   wherein the signal generator is configured to generate the reference waveform based on the control data.

4. The apparatus of claim 1:
   wherein, to determine the position of the user terminal, the position module
   determines an offset between a local time reference in the user terminal and a master time reference, and
   determines the position of the user terminal based on the pseudorange, the location of the transmitter, and the offset.

5. The apparatus of claim 1, wherein the receiver, the pseudorange module, and the position module are installed in the user terminal.

6. A method for determining the position of a user terminal, comprising:
   receiving, at the user terminal, a wireless digital radio signal;
   determining a pseudorange between the receiver and a transmitter of the digital radio signal based on the digital radio signal; and
   determining the position of the user terminal based on the pseudorange and a location of the transmitter;
   wherein the digital radio signal comprises a NRSC-5 signal, wherein said NRSC-5 signal is modulated using orthogonal frequency division multiplexing (OFDM) and is composed of a plurality of adjacent narrowband subcarriers, and further comprising:
   correlating the digital radio signal with a reference waveform;
   wherein the pseudorange is determined based on an output of the correlating.

7. The method of claim 6, further comprising:
   generating the reference waveform.

8. The method of claim 7, further comprising:
   receiving control data; and
   generating the reference waveform based on the control data.

9. The method of claim 6, wherein determining the position of the user terminal further comprises:
   determining an offset between a local time reference in the user terminal and a master time reference; and
   determining the position of the user terminal based on the pseudorange, the location of the transmitter, and the offset.

10. Non-transitory computer-readable storage media embodying instructions executable by a computer to perform a method comprising:
    determining a pseudorange between a receiver of a wireless digital radio signal and a transmitter of the digital radio signal based on the digital radio signal; and
    determining a position of a user terminal based on the pseudorange and a location of the transmitter;
    wherein the digital radio signal comprises a NRSC-5 signal, wherein said NRSC-5 signal is modulated using orthogonal frequency division multiplexing (OFDM) and is composed of a plurality of adjacent narrowband subcarriers, and wherein the method further comprises:
    correlating the digital radio signal with a reference waveform;
    wherein the pseudorange is determined based on an output of the correlating.

11. The non-transitory computer-readable media of claim 10, wherein the method further comprises:
    generating the reference waveform.

12. The non-transitory computer-readable media of claim 11, wherein the method further comprises:
    receiving control data; and
    generating the reference waveform based on the control data.

13. The non-transitory computer-readable media of claim 10, wherein determining the position of the user terminal comprises:
    determining an offset between a local time reference in the user terminal and a master time reference; and
    determining the position of the user terminal based on the pseudorange, the location of the transmitter, and the offset.

* * * * *

UNITED STATES PATENT AND TRADEMARK OFFICE
CERTIFICATE OF CORRECTION

PATENT NO.       : 8,253,627 B1  
APPLICATION NO.  : 12/705699  
DATED            : August 28, 2012  
INVENTOR(S)      : David Burgess Page 1 of 1

It is certified that error appears in the above-identified patent and that said Letters Patent is hereby corrected as shown below:

<u>On the Title Page</u>

Insert Item --(73) Assignee: TruePosition, Inc., Berwyn, PA (US)--

Signed and Sealed this  
Twenty-first Day of May, 2013

Teresa Stanek Rea  
*Acting Director of the United States Patent and Trademark Office*